July 27, 1943.  E. R. HOWARD  2,325,058
TEMPERATUE DETERMINATION
Filed April 19, 1941
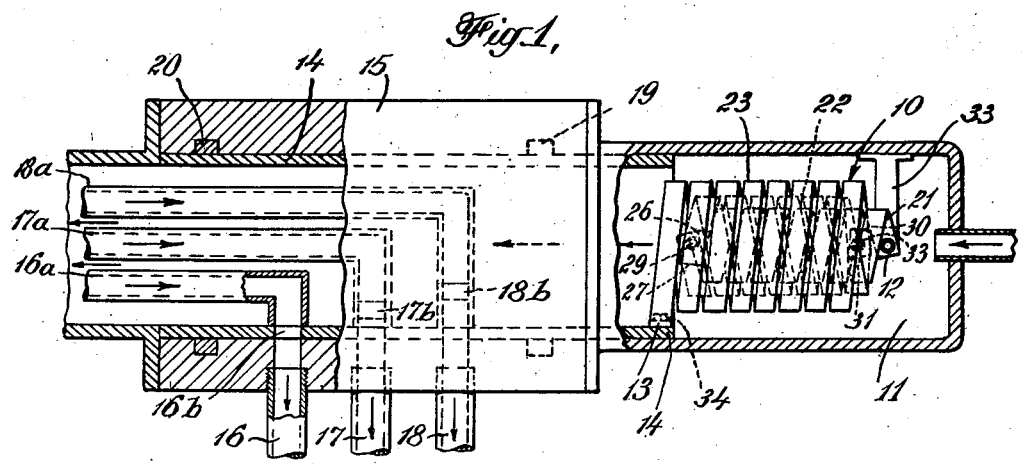
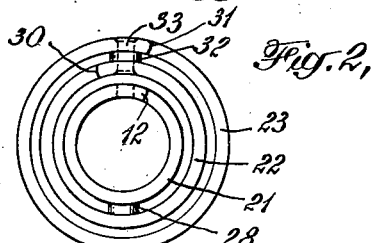
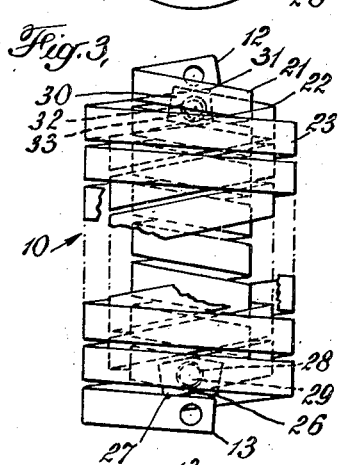 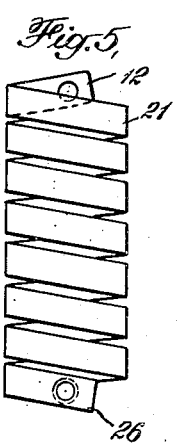  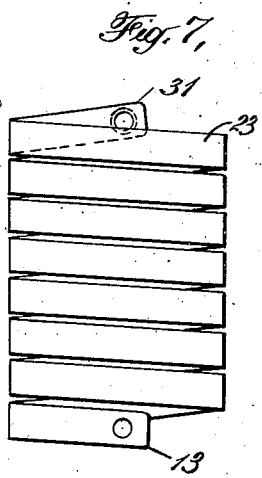
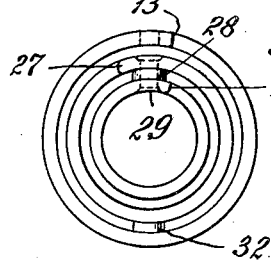
INVENTOR
*Ernest Russell Howard*
BY
*Pennie, Davis, Marvin and Edmonds*
ATTORNEYS Patented July 27, 1943

2,325,058

UNITED STATES PATENT OFFICE 2,325,058

TEMPERATURE DETERMINATION

Ernest Russell Howard, Ridgewood, N. J., assignor to The H. A. Wilson Company, Newark, N. J., a corporation of New Jersey Application April 19, 1941, Serial No. 389,475

2 Claims. (Cl. 236—34)

This invention is concerned with temperature determination and provides improved thermostatic apparatus that is particularly adapted to act as a prime mover of a valve or other flow control means in response to changes in the temperature of liquid flowing in a conduit. In its preferred aspect, the invention contemplates an improved flow control mechanism for use in an oil cooling system of an internal combustion engine or the like and employs a thermally responsive bimetallic element to operate directly a valve or other flow control means in the system. The apparatus of the invention is simple in construction, positive and forceful in operation and responds rapidly to changes in temperature of the liquid, even when this is relatively viscous, so that there is no serious time lag in controlling the flow in response to temperature change.

In modern internal combustion engines, particularly airplane engines, it is necessary to cool the oil circulated in the lubricating system and to control the temperature of this oil within narrow limits. To this end, radiators are provided in the oil circulation system and the active heat dissipation area of the radiators is varied as the temperature of the oil changes. Thus, when the engine is cold, as when it is started, the oil is forced through a first path which is such that the oil is heated up rapidly, with but little heat dissipation and with heat interchange between the oil from the engine itself and that in the radiator, thus bringing the oil to a uniform and fluent condition as rapidly as possible. After this initial heating period the oil is diverted to a second path which provides additional heat radiation surface proportionate to the heat to be dissipated from the oil. Thus, the second path may be provided with a plurality of radiators in parallel and which are cut in and out of the circuit as the temperature of the oil changes. These changes in the oil circuit are brought about automatically by movement of one or more thermostatically controlled valves in response to changes in the oil temperature. In order to avoid serious difficulties attendant upon improper operation of the oil cooling system, the valves must be operated positively and rapidly in response to changes in the temperature of the circulating oil. Moreover, the valve control mechanism should be compact, rugged and simple, for the space available for the control is distinctly limited and modern airplane engines are already so complex that further complexity introduced by auxiliary equipment must be kept at a minimum.

The relatively large force required to actuate the valve mechanism in the oil cooling system may be supplied through a motor or other prime mover, the movement of which is controlled by a switch or the like which is moved by slight forces such as those developed by small sensitive thermostats. Such a system, however, adds further complexity to an already complex structure, occupies too much space and is not sufficiently rugged and reliable for the exacting service.

From the standpoint of simplicity, a more desirable type of thermostatic valve control for service of the type described is one in which a thermally responsive element, for example, a bimetal is itself the prime mover for the valve. As indicated above, the force required to move the valve is relatively great and in a mechanism of the type contemplated this entire force must be generated in the bimetal as a result of a relatively slight change in its temperature. Consequently, the bimetal element for such service must be relatively large—much larger than those employed heretofore to actuate switches and small flow control mechanisms which may be moved with the application of only slight force. However, attempts to employ a variety of large bimetal structures have been unsuccessful. Those which were sufficiently rigid to exert substantially all the generated force to move the valve were, in general, insufficiently sensitive to temperature change so that there was too great a time lag in the valve control. On the other hand, those which were sufficiently sensitive to temperature change were insufficiently rigid and tended to bend excessively, so that they did not exert sufficient force to overcome the occasional tendency of the valve to stick and so were not sufficiently reliable or positive in operation.

In the course of my investigations, I have discovered that one type of bimetal structure, provided it is properly positioned and proportioned, is entirely adequate as a prime mover for valves of the type described and fulfills completely the requirements of compactness, ruggedness, simplicity and rapidity of response. Thus, I have discovered that if a thermally responsive element (comprising a plurality of bimetal strip helices disposed one within the other with substantially parallel axes and with substantial space between adjacent helices, and so combined that the rotational angles described by the individual helices under the influence of temperature are additive) is mounted within the conduit of an oil circulating system of an airplane engine with the axes of the helices extending in the direction of flow of the oil in the conduit (one free end of the helices being fixed and the other free end being directly connected to a rotatable valve) the valve will be moved positively and without substantial time lag in response to changes in the temperature of the oil flowing in the conduit. In such a structure, the oil flows through the annular spaces between the helices, so that moving oil is in contact with substantially all portions of the helices with rapid interchange of heat between the bimetal and the oil and consequent rapidity of response. The bimetal structure, due to the arrangement of its helices, is exceedingly rigid and manifests little or no tendency for flexure along the axes of the helices so that substantially the entire force and movement occasioned in the structure by temperature change is transmitted to the valve and usefully employed.

In summary, my invention contemplates in apparatus for controlling the flow of liquid in an internal combustion engine in response to changes in the temperature of the liquid, the combination which comprises a conduit through which the liquid is flowed, a thermally responsive structure mounted in the conduit and free of the walls thereof with its longitudinal axis extending in the direction of liquid flow in the conduit and comprising a group of bimetal strip helices disposed one within the other with their longitudinal axes substantially parallel and with annular passages for the liquid therebetween, connecting spacer members disposed between the helices at neighboring ends and connecting the helices rigidly by said ends but spaced from each other by the annular passages which are approximately equal in thickness to the strips, the helices being so connected to each other that the rotational angles described by the individual helices are additive, one free end of the group of helices being fixed, and flow control means directly connected to the other free end of the group of helices at a point that is spaced angularly from the nearest connecting spacer member between helices by an angle that is greater than the combined angular movement of the group of helices in response to the maximum temperature change.

In the preferred form of my apparatus, the space between adjacent helices is approximately equal to the thickness of the strips of which the helices are composed. I have found that if the apparatus is so constructed, it responds with sufficient rapidity to changes in temperature of the liquid flowing in contact therewith (so that there is no serious time lag in the operation of the apparatus) and is also sufficiently rigid that it can be employed to exert a relatively large force (in proportion to its mass) on a valve or other piece of fluid-control apparatus without warping longitudinally or vibrating. In other words, when the channels for flow of liquid between the helices are approximately the same in thickness as the helices, there is adequate opportunity for heat interchange combined with adequate stiffness, greater stiffness being obtainable through sacrifice of rapidity of response and vice versa.

Preferably the helices of the apparatus are connected at adjacent ends by means of spacers disposed between the helices so as to maintain the required substantial distance therebetween and avoid binding.

If the apparatus of my invention is employed for flow control purposes, for example, to turn a valve in the conduit, one free end of the helices (say the free end of the innermost helix) is fixed, while the other free end of the helices (say the free end of the outside helix) is connected to the valve. In such a structure, I have found that the angular displacement between the end of the helix connected to the valve and the nearest connection between helices should be greater than the maximum angle of rotation required in the operation of the valve. In other words, the helix assembly must be supported in such a way that no component helix is interfered with during operation of the apparatus by the bolts with which the helix assembly is mounted.

In practical application, the nested helices of the apparatus of my invention are generally substantially larger than bimetal helices employed heretofore for temperature determination, since the force which they are required to exert generally is large.

These and other features of my invention will be more thoroughly understood in the light of the following detailed description taken in conjunction with the accompanying drawing in which Fig. 1 is a schematic diagram of a portion of the lubricating oil circuit of an internal combustion engine showing the application of my invention as a prime mover for a sleeve valve;

Fig. 2 is a plan view of one end of the nested bimetal helices of Fig. 1;

Fig. 3 is an elevation of the structure of Fig. 2;

Fig. 4 is a plan view of the other end of the structure of Fig. 2;

Fig. 5 is an elevation of the innermost helix of the apparatus illustrated in the above figures;

Fig. 6 is an elevation of the intermediate helix of this apparatus; and

Fig. 7 is an elevation of the exterior helix of the structure.

Referring now to the drawing and particularly to Fig. 1, it will be observed that a bimetal structure 10 (comprising three bimetal strip helices nested coaxially one within the other with substantial space between them as described in greater detail hereinafter) is disposed in a conduit 11 through which oil flowing in the direction indicated by the arrow with the axis of the helices substantially parallel to the direction of oil flow. One "free" end 12 of the bimetal structure is fixed, while the other "free" end 13 is attached to the moving member 14 of a sleeve valve 15. The sleeve valve is adapted to control the flow of oil through a plurality of conduits 16, 17 and 18 which are threaded into the valve. Thus, oil flowing in an inlet conduit 16a may pass through a port 16b in the sleeve valve and out through the conduit 16 provided that the port is aligned with the inlet and outlet conduits. The sleeve valve is provided with an additional port 17b disposed laterally and angularly with respect to the first port, and permits oil to flow from an inlet conduit 17a through the conduit 17 when the port 17b is in the correct position. Similarly, a third port 18b is disposed laterally and angularly with respect to the other two ports, and this port, if properly disposed, permits oil to flow from an inlet conduit 18a through the conduit 18.

The bimetal structure serves to rotate the moving member of the sleeve valve which is held in the valve by means of rings 19 and 20. These rings permit the moving member of the sleeve valve to rotate, but prevent lateral movement.

The apparatus is adjusted so that when the oil is at one temperature the port 16b coincides with the conduits 16a and 16 and permits flow of oil therethrough; at another temperature, the moving member of the sleeve valve is rotated so that the port 17b coincides with the conduits 17a and 17 and permits flow of oil through these conduits while cutting off the flow through conduits 16a, 16, 18a and 18; at still a third temperature, the port 18b coincides with the conduits 18a and 18 permitting flow of oil through these conduits while cutting off the flow through the other conduits.

To consider the bimetal structure 10 in greater detail, reference should be made to Figs. 2 to 7, inclusive, which show that the structure comprises three bimetal strip helices 21, 22, 23 disposed co-axially one within the other, but with the ends of the innermost helix displaced from the ends of the outermost helix. Thus, the end 12 of the innermost helix (the upper end as shown in Figs. 3 and 5) projects from the assembly, while the opposite end 13 of the outermost helix likewise projects.

The inner helix 21 is left-hand wound; the intermediate helix 22 is right-hand wound, and the outer helix 23 is left-hand wound to correspond to the inner helix. As shown in Fig. 3, an end 26 of the inner helix is riveted to the adjacent end 27 of the intermediate helix with a washer 28 disposed between the two ends to act as a spacer. Thus, a rivet 29 passes through the washer and the ends of the respective helices, the ends of the rivet being flush with the surfaces of the helices (see Fig. 4). The opposite end 30 of the intermediate helix is riveted in like manner to the end 31 of the outer helix, a washer 32 through which a rivet 33 passes being employed as a spacer, with the ends of the rivet flush with the outer surface of the respective helices (see Fig. 2). The washers are approximately the same in thickness as the strips from which the helices are wound.

To consider the particular example of bimetal structure illustrated in Figs. 2 to 4, which is designed to have a rotation of .75 angular degrees for each degree Fahrenheit change in temperature, all three helices are wound from bimetal strips approximately ¼" wide and .105" thick, and all are wound with the high expanding side of the strip outward.

The high expanding side of the bimetal strip employed in all three helices is a ferrous alloy containing about 19% nickel and 2% chromium, the balance being substantially iron; the low expanding side is a ferrous alloy consisting of about 36% nickel and the balance iron.

The inner helix 21 is formed of a strip about 23" long and has an axial length of about 2¾" and an inside diameter of about ¾". The intermediate helix has a strip length of about 29", an axial length of about 2½" and a mean diameter of about 1⅞". The outer helix has a strip length of about 41", an axial length of about 2½" and an outside diameter of about 1¼". The space between the helices is about equal to the thickness of the strip from which the helices are formed and the pitch of the helices is such as to leave a space between adjacent turns approximately equal to the thickness of the strip.

It will be observed that the series of helices are connected together in such a way that their rotational angles under the influence of temperatures are additive. Thus, all of the helices tend to turn in the same direction as they are heated with the result that if one extreme end of the series of helices (say the end 12) is held stationary, the other extreme end (say the end 13) will be moved by all three helices as the bimetal structure is heated or cooled.

As indicated above, all of the helices of the specific example given here are wound with the high expanding side of the bimetal strip out, so that the intermediate helix must be of opposite hand to the other two helices in order that their rotational angles be additive. If desired, all of the coils may be of the same hand, but in that case alternate helices must be wound with the high expanding sides of the strip oppositely disposed. To consider a structure with three nested helices, the intermediate helix must be wound with its high expanding side inward if the high expanding sides of the other two helices are outward.

In operation, one end of the series of helices (say the end 12) is fixed, while the other end is attached to a valve, indicator or other device to be moved. Thus, as shown in Fig. 1, the protruding end 12 of the inner helix (which is one extreme end of the series of helices) is fixed to a stationary bracket 33 or other supporting means, and the opposite end 13 of the series of helices, is fastened to the movable member of the sleeve valve by a bolt 34. As the temperature of the series of helices is changed due to a change in the temperature of the oil flowing longitudinally through the nested helices, the end 13 of the outer helix will be moved in one direction as the temperature of the helices is lowered and in the opposite direction as the temperature of the helices is raised. This movement brings about a rotation of the movable member of the sleeve valve as described hereinbefore.

As shown in Fig. 4, the extreme or "free" end 13 of the outermost helix, i. e., the end that is fastened to the valve, should be spaced angularly from the neighboring connection (26, 27) between the intermediate helix and the inner helix by an angle that is greater than the total angular movement of the combined helices in a given installation. In the specific example considered here, the total angular rotation of the helices is about 90°. Consequently, the end 13 of the outermost helix should be displaced clockwise from the neighboring connection between the intermediate and innermost helices by something in excess of this—say by 100 angular degrees. Otherwise, as the bimetal assembly is heated the connection between the helix and valve may come in contact with the connection between the innermost and the intermediate helices, causing the apparatus to jam.

I claim:

1. In apparatus for controlling the flow of liquid in an internal combustion engine in response to changes in the temperature of the liquid, the combination which comprises a conduit through which the liquid is flowed, a thermally responsive structure mounted in the conduit and free of the walls thereof with its longitudinal axis extending in the direction of liquid flow in the conduit and comprising a group of bimetal strip helices disposed one within the other with their longitudinal axes substantially parallel and with annular passages for the liquid therebetween, connecting spacer members disposed between the helices at neighboring ends and connecting the helices rigidly by said ends but spaced from each other by the annular passages which are approximately equal in thickness to the strips, the helices being so connected to each other that the rotational angles described by the individual helices are additive, one free end of the group of helices being fixed, and flow control means directly connected to the other free end of the group of helices at a point that is spaced angularly from the nearest connecting spacer member between helices by an angle that is greater than the combined angular movement of the group of helices in response to the maximum temperature change.

2. In apparatus for controlling the flow of oil in an internal combustion engine in response to changes in the temperature of the oil, the combination which comprises a conduit through which the oil is flowed, a thermally responsive structure mounted in the conduit and free of the walls thereof with its longitudinal axis extending in the direction of oil flow in the conduit and comprising a rigid group of bimetal strip helices disposed one within the other with their longitudinal axes substantially parallel and with annular channels for the oil therebetween, connecting spacer members joining rigidly together the helices at adjacent ends and maintaining the annular channels between helices approximately equal in thickness to the strips, the helices being so connected to each other that the rotational angles described by the individual helices are additive, one free end of the group of helices being fixed, and flow control means directly connected to the other free end of the group of helices at a point that is spaced angularly from the nearest connecting spacer member between helices by an angle that is greater than the combined angular movement of the combined helices in response to the maximum temperature change.

ERNEST RUSSELL HOWARD.